(12) United States Patent
Nguyen et al.

(10) Patent No.: US 12,033,134 B2
(45) Date of Patent: Jul. 9, 2024

(54) SYSTEM FOR INITIATING MISPLACED CARD ACTIONS VIA AN AUGMENTED REALITY ENABLED PRIVATE DATA-LESS CARD DEVICE

(71) Applicant: BANK OF AMERICA CORPORATION, Charlotte, NC (US)

(72) Inventors: Tai Tan Nguyen, Frisco, TX (US); Renuga Mohan, Tamil Nadu (IN); Preetimanda Pattanaik, Plano, TX (US); Anupama Rao, The Colony, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 142 days.

(21) Appl. No.: 17/977,350

(22) Filed: Oct. 31, 2022

(65) Prior Publication Data

US 2024/0144237 A1   May 2, 2024

(51) Int. Cl.
*G06Q 20/34* (2012.01)
*G06Q 20/38* (2012.01)
*G06Q 20/40* (2012.01)

(52) U.S. Cl.
CPC ......... *G06Q 20/352* (2013.01); *G06Q 20/355* (2013.01); *G06Q 20/389* (2013.01); *G06Q 20/4014* (2013.01)

(58) Field of Classification Search
None
See application file for complete search history.

(56) References Cited

U.S. PATENT DOCUMENTS

| | | | |
|---|---|---|---|
| 9,160,830 B2 | 10/2015 | Jain et al. | |
| 9,412,121 B2 | 8/2016 | Tatzel et al. | |
| 9,477,852 B1 * | 10/2016 | Neale | G06Q 20/352 |
| 9,582,802 B2 | 2/2017 | Bachenheimer et al. | |

(Continued)

FOREIGN PATENT DOCUMENTS

| | | | | |
|---|---|---|---|---|
| EP | 2780900 A2 * | 9/2014 | | G06F 21/88 |
| WO | WO-2016033165 A1 * | 3/2016 | | F16K 15/026 |
| WO | WO-2024018418 A1 * | 1/2024 | | G06F 9/45558 |

*Primary Examiner* — Paul S Schwarzenberg
(74) *Attorney, Agent, or Firm* — Moore & Van Allen PLLC; James C. Edwards

(57) ABSTRACT

Implementing augmented reality to display recovery and/or security options on a private data-less card device (i.e., card device that does not include private data visible on a card facing) that has been misplaced. A card device includes a wireless communication mechanism that is configured to communicate card device and/or user-identifying data to a mobile communication device in possession of a user that includes an application configured to verify that the user is not a rightful possessor/owner of the card device based on the card device and/or user-identifying data. In response, the application launches the image capturing device on the mobile communication device and an image is captured of either the front facing or the back facing of the card device. Consequently, the application presents an augmented reality display that includes activatable links superimposed in augmented reality form on the captured image of either the front facing or the back facing of the card device. The activable links provide the finder of the card device recovery and/or security options.

20 Claims, 9 Drawing Sheets

(56) References Cited

U.S. PATENT DOCUMENTS

| | | |
|---|---|---|
| 9,723,131 B1 | 8/2017 | Ramalingam et al. |
| 9,955,352 B2 | 4/2018 | Mahaffey et al. |
| 10,068,231 B2 | 9/2018 | Lewis et al. |
| 10,332,103 B2* | 6/2019 | Carpenter ........... G06Q 20/3263 |
| 10,510,080 B2 | 12/2019 | Ranganath et al. |
| 10,574,692 B2 | 2/2020 | Drake |
| 10,673,636 B1 | 6/2020 | Finke et al. |
| 10,853,855 B2 | 12/2020 | John |
| 11,049,094 B2 | 6/2021 | Filler |
| 11,062,098 B1* | 7/2021 | Bergeron ............... H04L 9/3242 |
| 2012/0047072 A1 | 2/2012 | Larkin |
| 2020/0202313 A1* | 6/2020 | Eidam ..................... A61B 5/117 |
| 2021/0264432 A1 | 8/2021 | Devdas et al. |
| 2021/0398121 A1 | 12/2021 | Jackson |
| 2022/0084028 A1* | 3/2022 | Rule .................... G06Q 20/352 |
| 2022/0271940 A1* | 8/2022 | Rogers ................. G06F 21/575 |
| 2022/0286450 A1 | 9/2022 | Kaditz et al. |
| 2023/0085206 A1* | 3/2023 | Rule ................. G06Q 20/3263 |
| | | 235/380 |

* cited by examiner

SYSTEM FOR INITIATING MISPLACED CARD ACTIONS VIA AN AUGMENTED REALITY ENABLED PRIVATE DATA-LESS CARD DEVICE

FIELD OF THE INVENTION

The present invention is related to data security and, more specifically, providing for an augmented reality display of recovery or security actions in the event that a private data-less card device is misplaced.

BACKGROUND

Card devices typically have private data (e.g., name, account number and the like) visible on the front facing and/or the back facing of the card. As such, in the event that a wrongdoer gains possession of the card or otherwise has the capability to view and copy the private data visible on the card, the rightful possessor/owner (i.e., user) of the card device is in jeopardy of having the private data exposed or otherwise used to the detriment of the user.

Moreover, card devices, by their very nature, are prone to being misplaced. Once a user becomes aware that their card device has been misplaced, they may not know precisely where the misplacement of the card device occurred. Moreover, due to the potential for misuse if the card device should be found by someone with nefarious intentions, the user only has a short period of time to locate a misplaced card device before they take steps to deactivate the card device (i.e., report the card device as lost to a card-controlling entity).

Therefore, a need exists to develop systems, methods and the like that provide for securing private data that would otherwise be visible on a card device. In this regard, a need exists to develop a card device that does include private data printed on a card facing but allows for the user to readily view the private data as needed. In addition, a need exists to develop systems, methods and the like for implementing recovery and/or security actions in the event that a card device that has been misplaced has been found by someone other than the owner/user of the card device.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by implementing augmented reality to display recovery and/or security options on a private data-less card device (i.e., card device that does not include private data visible on a card facing) that has been misplaced. The card device includes a wireless communication mechanism that is configured to communicate card device-identifying data and/or user-identifying data to a mobile communication device in possession of a user. In specific embodiments of the invention, the wireless communication mechanism may include coded-indicia (e.g., Quick Response (QR) code or the like) displayed on a facing of the card device, which encodes card-identifying data. In other specific embodiments of the invention, the wireless communication mechanism may be user-specific imagery displayed on a facing of the card, such as a unique background image or the which, which when captured by the mobile communication device, image recognition techniques are used to identify the user. In still further specific embodiments of the invention, a short-range wireless communication device (e.g., Near Field Communication (NFC) or Radio Frequency identification (RFID) or the like) may be embedded in the card device, such that the short-range wireless device is capable of communicating the card device-identifying data and/or user-identifying data to the mobile communication device.

The mobile communication device includes an application that is configured to receive the card device-identifying data and/or user-identifying data from the card device and verify that the user is not a rightful possessor/owner of the card device based at least on the card device-identifying data and/or the user-identifying data. Once the user has been verified as not being the owner of the card device, the application launches the image capturing device on the mobile communication device and an image is captured of either the front facing or the back facing of the card device. Consequently, the application presents an augmented reality display that includes activatable links (i.e., hyperlinks or the like) superimposed in augmented reality form on the captured image of either the front facing or the back facing of the card device. The activable links provide the finder of the card device recovery and/or security options.

In specific embodiments of the invention, one of the activatable link that are superimposed in augmented reality form on the card is configured to, upon user activation, generate and initiate communication of an alert to the rightful possessor of the card device that indicates that the card device has been found and provides the current geolocation of the card device (i.e., the current location of the mobile communication device as determined by Global Positioning System (GPS) mechanisms therein or the like). Based on the alert, the rightful possessor/owner of the card device can locate and re-possess the card device.

In other specific embodiments of the invention, one of the activatable link that are superimposed in augmented reality form on the card is configured to, upon user activation, generate and initiate communication of a lost card report to a card-issuing entity. In still further specific embodiments of the invention, one of the activatable link that are superimposed in augmented reality form on the card is configured to, upon user activation, initiate a telephone call to the rightful possessor of the card device.

In other specific embodiments of the invention, the application is further configured to, in response to determining that the user is not the rightful possessor of the card device, temporarily disable the card device (i.e., prohibit the card device from initiating a resource transfer event).

A system for misplaced card device security defines first embodiments of the invention. The system includes a card device having a front facing and a back facing, in which neither facing display any private data used to initiate a resource transfer event. The card device includes a wireless communication mechanism configured to wirelessly communicate at least one of card device-identifying data and user-identifying data. The system additionally includes a mobile communication device in possession of a user. The mobile communication device includes a memory, one or more processing devices in communication with the memory, and an image capturing device in communication with at least one of the one or more processing devices, and a display in communication with at least one of the one or more processing devices. The memory stores an application that is executable by at least one of the one or more processing devices. The application is configured to receive, via wireless communication from the card device, at least one of (i) the card device-identifying data and (ii) the user-identifying data and determine that the user is not a rightful possessor of the card device based on the least one of the card device-identifying data and the user-identifying data. In response to determining that the user is not the rightful possessor of the card device, the application is further configured to launch the image capturing device, capture, via the image capturing device, an image of either the front facing or the back facing of the card device, and present, on the display, an augmented reality display superimposed on the image of either the front facing or the back facing of the card device, that displays one or more activatable links, each activatable link associated with a misplaced card device action.

In specific embodiments of the system, the application is further configured to present the augmented reality display that further includes the one or more activatable links, such that one of the one or more activatable links is configured to, upon user activation, generate and initiate communication of an alert to the rightful possessor of the card device that indicates a current geolocation of the card device.

In other specific embodiments of the system, the application is further configured to present the augmented reality display that further includes the one or more activatable links, such that one of the one or more activatable links is configured to, upon user activation, generate and initiate communication of a lost card report to a card-issuing entity.

In further specific embodiments of the system, the application is further configured to present the augmented reality display that further includes the one or more activatable links, such that one of the one or more activatable links is configured to, upon user activation, initiate a telephone call to the rightful possessor of the card device.

Moreover, in additional specific embodiments of the system, the application is further configured to, in response to determining that the user is not the rightful possessor of the card device, disable the card device for resource transfer event use.

In further specific embodiments of the system, the wireless communication mechanism is coded-indicia configured to encode the card device-identifying data and displayed on at least one of the front facing and back facing of the card device. In such embodiments of the system, the application is further configured to (i) receive the card device-identifying data by capturing, via the image-capturing device, an image of the coded-indicia and (ii) determine that the user is not the rightful possessor of the card device by decoding the captured coded-indicia to identify the card device-identifying data and failing to match the card device-identifying data to the user.

In additional specific embodiments of the system, the wireless communication mechanism is a user-specific image associated with the user-identifying data and displayed on at least one of the front facing and back facing of the card device. In such embodiments of the system, the application is further configured to (i) receive the user-identifying data by capturing, via the image-capturing device, an image of the user-specific image, and (ii) determine that the user is not the rightful possessor of the card device by implementing image recognition techniques to determine that the user-specific image is not associated with the user.

Moreover, in additional specific embodiments of the system, the wireless communication mechanism is a short-range wireless communication device configured to communicate at least one of the card device-identifying data and the user-identifying data and embedded in the card device. in such embodiments of the system, the application is further configured to receive, via short-range wireless communication, the at least one of the card device-identifying data and the user-identifying data.

A computer-implemented method for misplaced card device security defines second embodiments of the invention. The method is executed by one or more computing processor devices. The method includes receiving, via wireless communication from a private data-less card device, at least one of the card device-identifying data and the user-identifying data and determining that the user is not a rightful possessor of the private data-less card device based on the least one of the card device-identifying data and the user-identifying data. In response to determining that the user is not the rightful possessor of the card device, the method further includes launching an image capturing device disposed on a mobile communication device possessed by the user, capturing, via the image capturing device, an image of either the front facing or the back facing of the private data-less card device; and presenting, on a display of the mobile communication device, an augmented reality display superimposed on the image of either the front facing or the back facing of the card device. The augmented reality display includes one or more activatable links, each activatable link associated with a misplaced card device action.

In specific embodiments of the computer-implemented method, presenting further includes presenting the augmented reality display that further includes the one or more activatable link, such that one of the one or more activatable links is configured to, upon user activation, generate and initiate communication of an alert to the rightful possessor of the card device that indicates a current geolocation of the card device.

In other specific embodiments of the computer-implemented method, presenting further includes presenting the augmented reality display that further includes the one or more activatable link, such that one of the one or more activatable links is configured to, upon user activation, generate and initiate communication of a lost card report to a card-issuing entity.

In still further specific embodiments of the computer-implemented method, presenting further includes presenting the augmented reality display that further includes the one or more activatable link, such that one of the one or more activatable links is configured to upon user activation, initiate a telephone call to the rightful possessor of the card device.

Moreover, in additional specific embodiments of the computer-implemented method, in response to determining that the user is not the rightful possessor of the card device, the computer-implemented method further includes disabling the card device for resource transfer event use.

In additional specific embodiments of the computer-implemented method, receiving further includes receiving, via the wireless communication from a private data-less card device, at least one of the card device-identifying data and the user-identifying data, wherein the wireless communication is chosen from the group consisting of (i) capturing coded-indicia displayed on at least one of the front facing and back facing of the card device, wherein the coded-indicia is configured to encode the card device-identifying data, (ii) capturing a user-specific image displayed on at least one of the front facing and back facing of the card device, wherein the user-specific image is associated with the user-identifying data, and (iii) receiving short-range wireless communication from the card device, wherein the short-range wireless communication is configured to communicate at least one of the card device-identifying data and the user-identifying data.

A computer program product including a non-transitory computer-readable medium defines third embodiments of the invention. The computer-readable medium includes sets of codes for causing one or more computing processing devices to receive, via wireless communication from a private data-less card device, at least one of the card device-identifying data and the user-identifying data and determine that the user is not a rightful possessor of the private data-less card device based on the least one of the card device-identifying data and the user-identifying data. In response to determining that the user is not the rightful possessor of the card device, the sets of codes are further configured to cause the computing processing device(s) to launch an image capturing device disposed on a mobile communication device possessed by the user, capture, via the image capturing device, an image of either the front facing or the back facing of the private data-less card device, and present, on a display of the mobile communication device, an augmented reality display superimposed on the image of either the front facing or the back facing of the card device. The augmented reality display includes one or more activatable links, each activatable link associated with a misplaced card device action.

In specific embodiments of the computer program product, the set of codes for causing the one or more computing processor devices to present are further configured to cause the one or more computing processor devices to present the augmented reality display that further includes the one or more activatable link, such that one of the one or more activatable links is configured to, upon user activation, generate and initiate communication of an alert to the rightful possessor of the card device that indicates a current geolocation of the card device.

In other specific embodiments of the computer program product, the set of codes for causing the one or more computing processor devices to present are further configured to cause the one or more computing processor devices to present the augmented reality display that further includes the one or more activatable links, such that one of the one or more activatable links is configured to, upon user activation, generate and initiate communication of a lost card report to a card-issuing entity.

In still further specific embodiments of the computer program product, the sets of codes further include a set of codes for cause the one or more computing processor devices to, in response to determining that the user is not the rightful possessor of the card device, disable the card device for resource transfer event use.

Moreover, in other specific embodiments of the computer program product, the set of codes for causing the one or more computing processor devices to receive are further configured to cause the one or more computing processor devices to receive, via wireless communication from a private data-less card device, at least one of the card device-identifying data and the user-identifying data, wherein the wireless communication includes capturing coded-indicia displayed on at least one of the front facing and back facing of the card device, wherein the coded-indicia is configured to encode the card device-identifying data.

Additionally, other specific embodiments of the computer program product, the set of codes for causing the one or more computing processor devices to receive are further configured to cause the one or more computing processor devices to receive, via wireless communication from a private data-less card device, at least one of the card device-identifying data and the user-identifying data, such that the wireless communication includes capturing a user-specific image displayed on at least one of the front facing and back facing of the card device, wherein the user-specific image is associated with the user-identifying data.

Thus, according to embodiments of the invention, which will be discussed in greater detail below, the present invention provides for augmented reality display of recovery and/or security options on a private data-less card device (i.e., card device that does not include private data visible on a card facing) that has been misplaced. The card device includes a wireless communication mechanism that is configured to communicate card device-identifying data and/or user-identifying data to a mobile communication device in possession of a user. The mobile communication device includes an application that is configured to receive the card device-identifying data and/or user-identifying data from the card device and verify that the user is not a rightful possessor/owner of the card device based at least on the card device-identifying data and/or the user-identifying data. In response, the application launches the image capturing device on the mobile communication device and an image is captured of either the front facing or the back facing of the card device. Consequently, the application presents an augmented reality display that includes activatable links (i.e., hyperlinks or the like) superimposed in augmented reality form on the captured image of either the front facing or the back facing of the card device. The activable links provide the finder of the card device recovery and/or security options.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
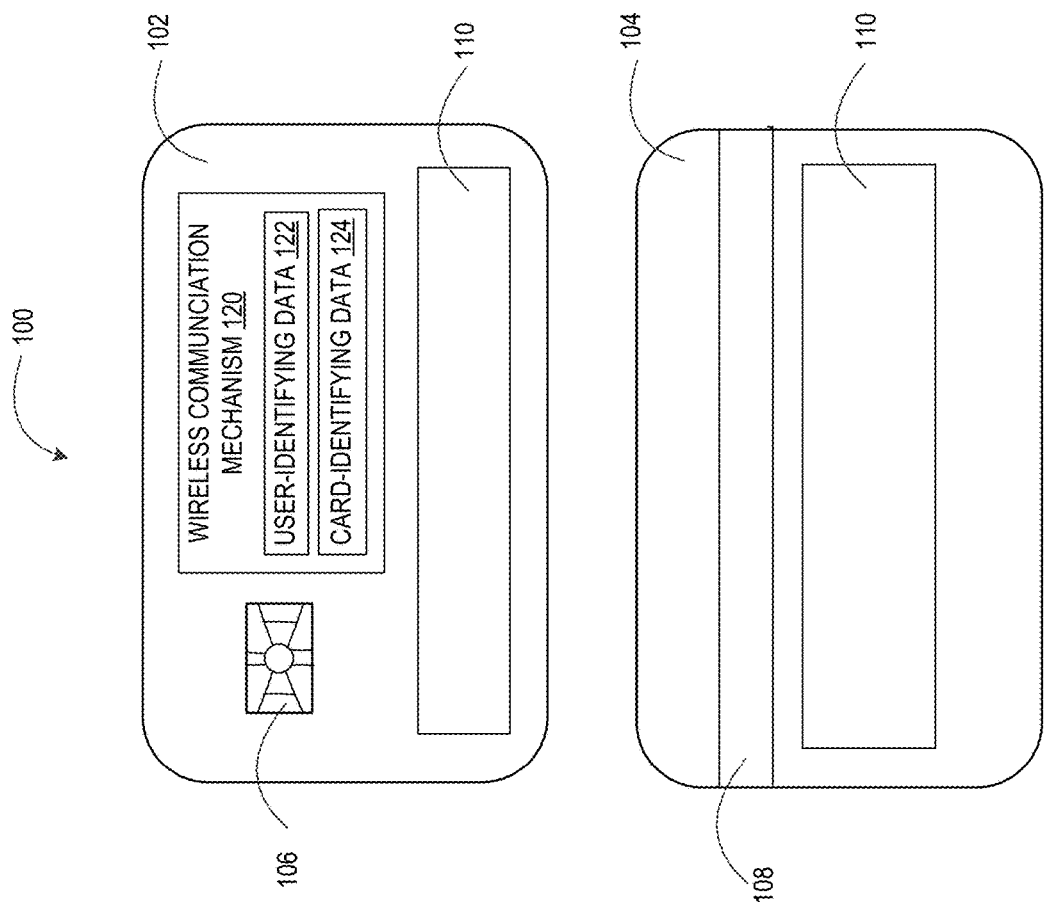
Figure 2A:
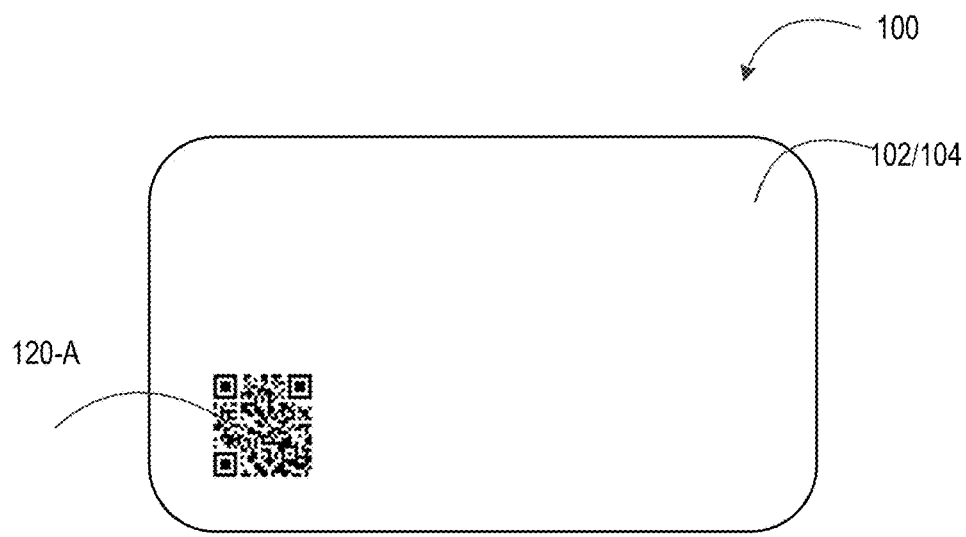
Figure 2B:
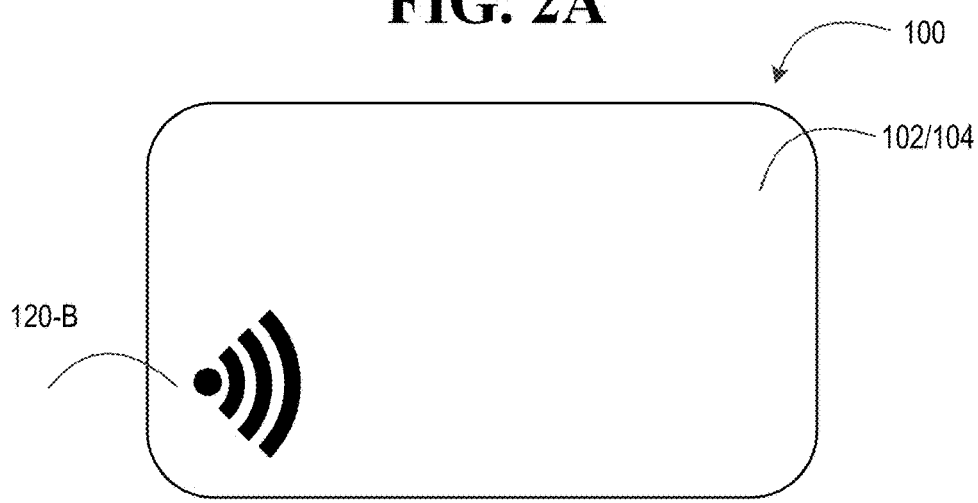
Figure 2C:
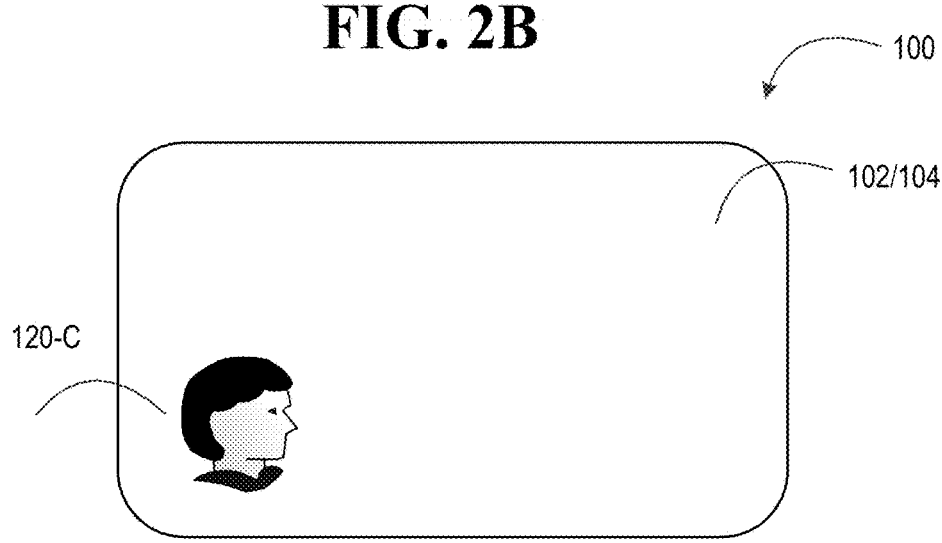
Figure 3:
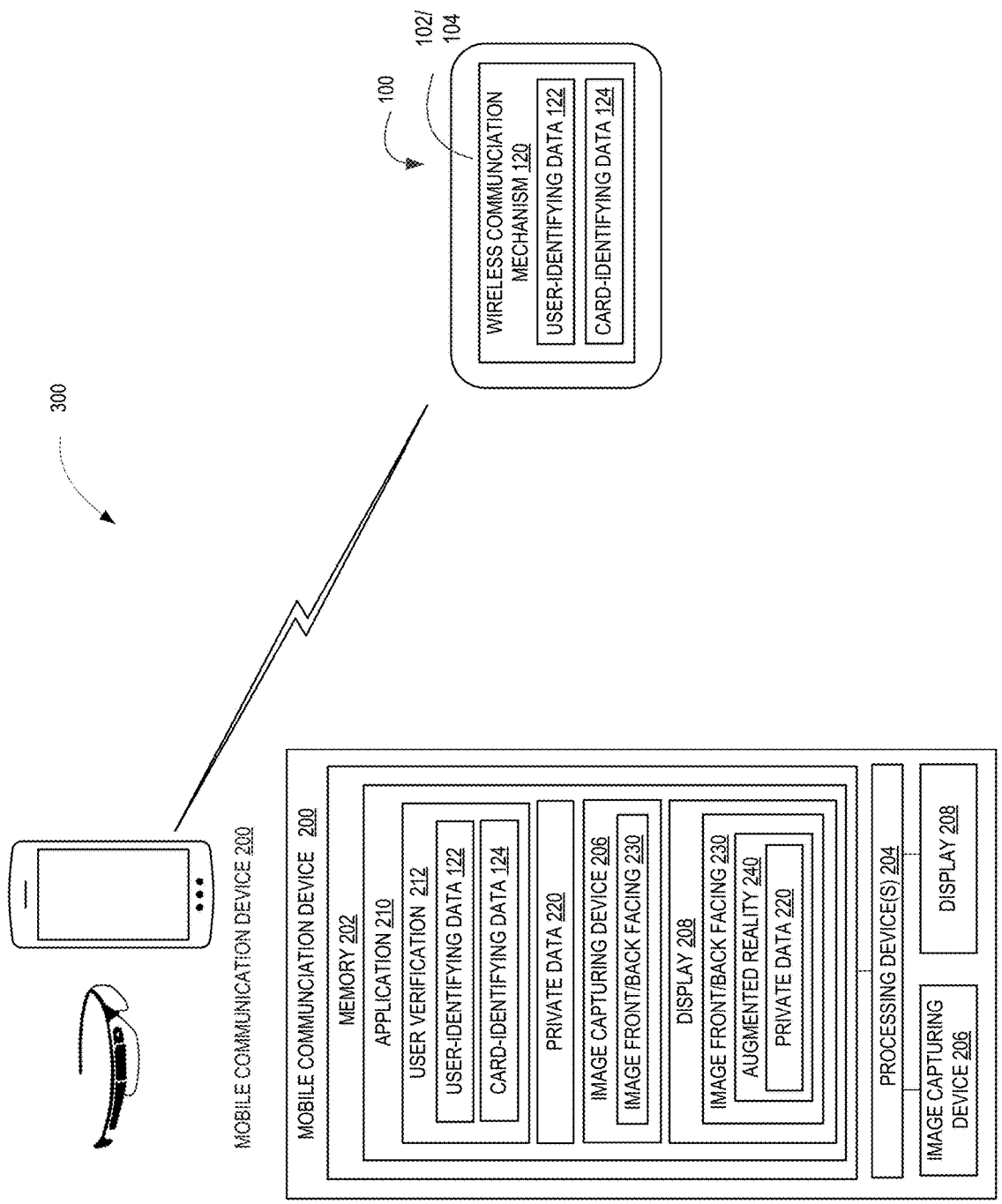
Figure 4:
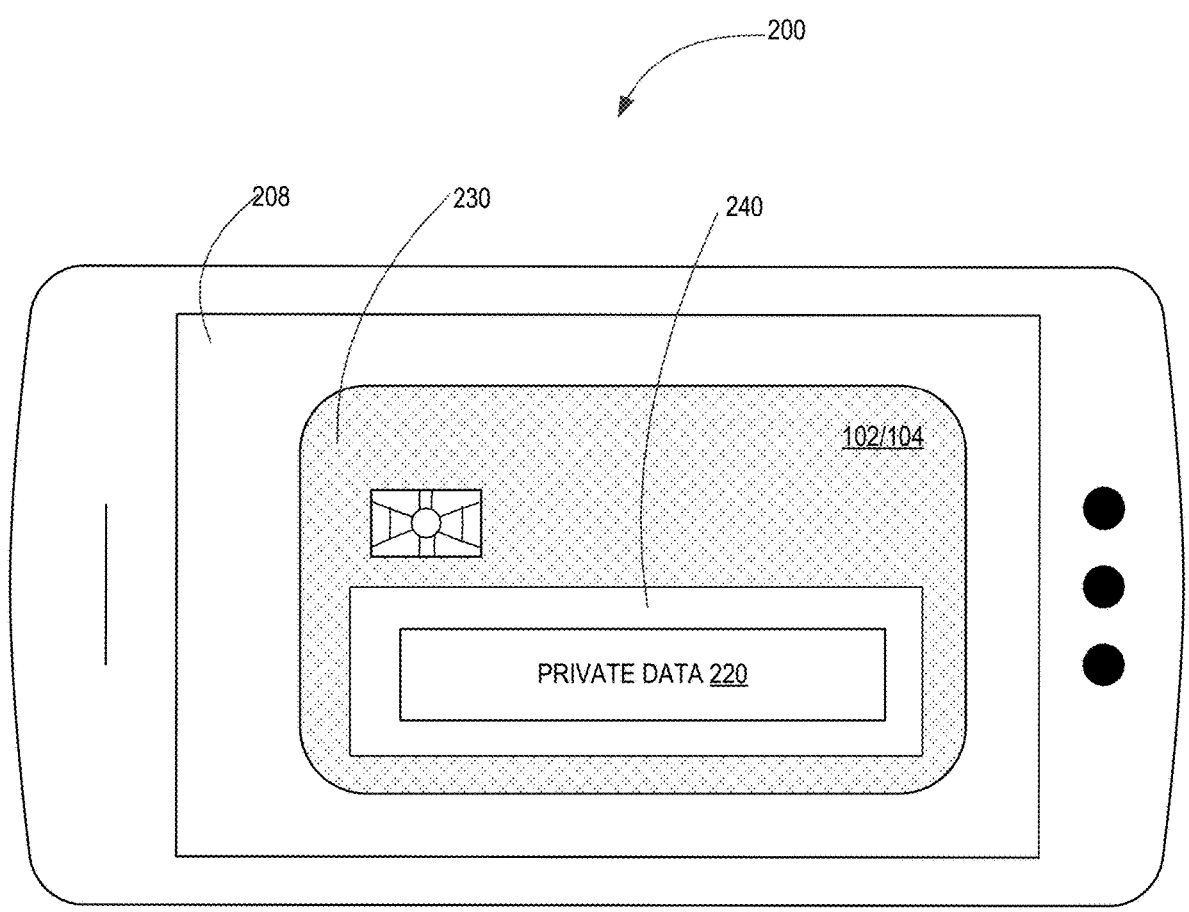
Figure 5:
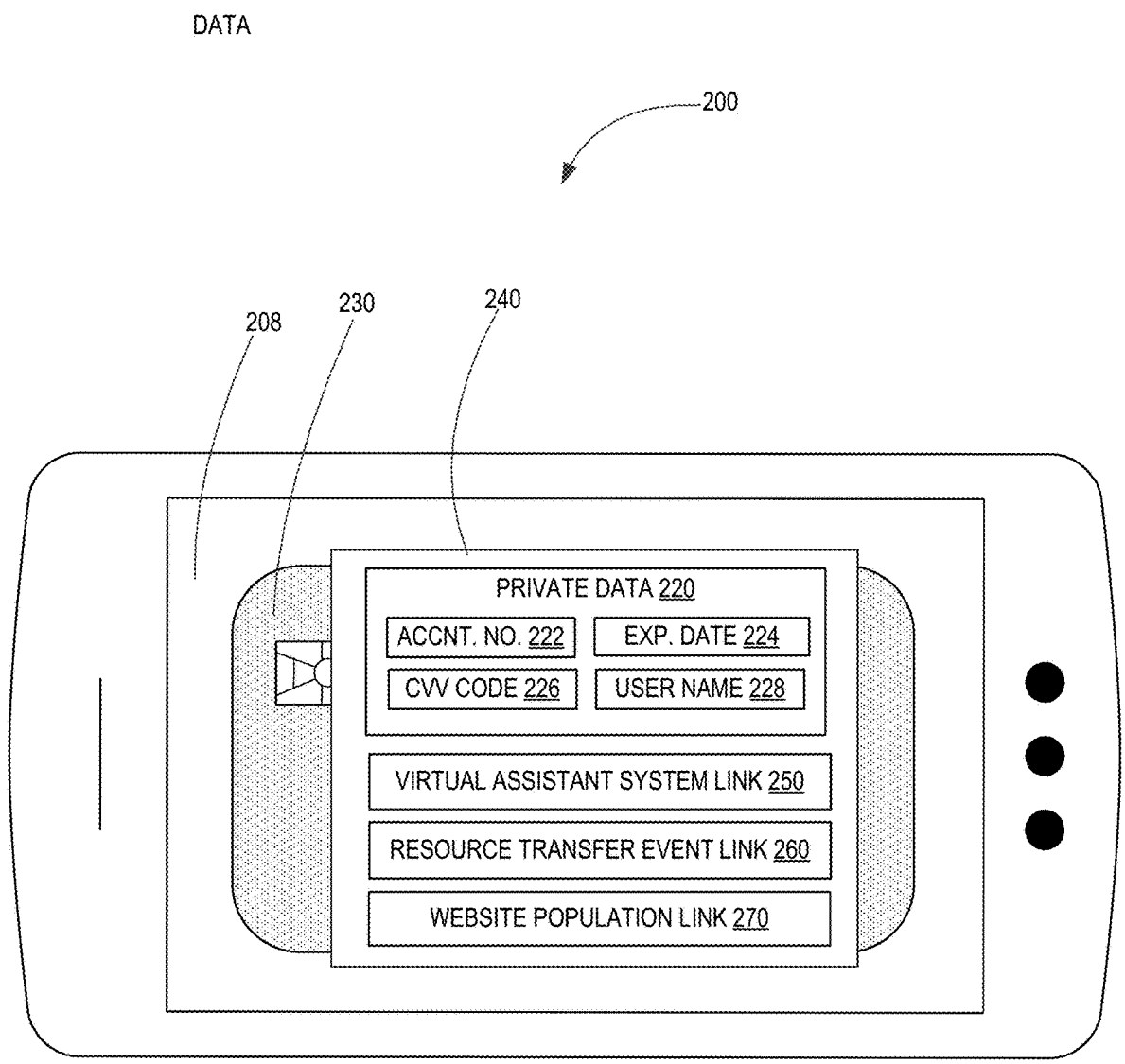
Figure 6:
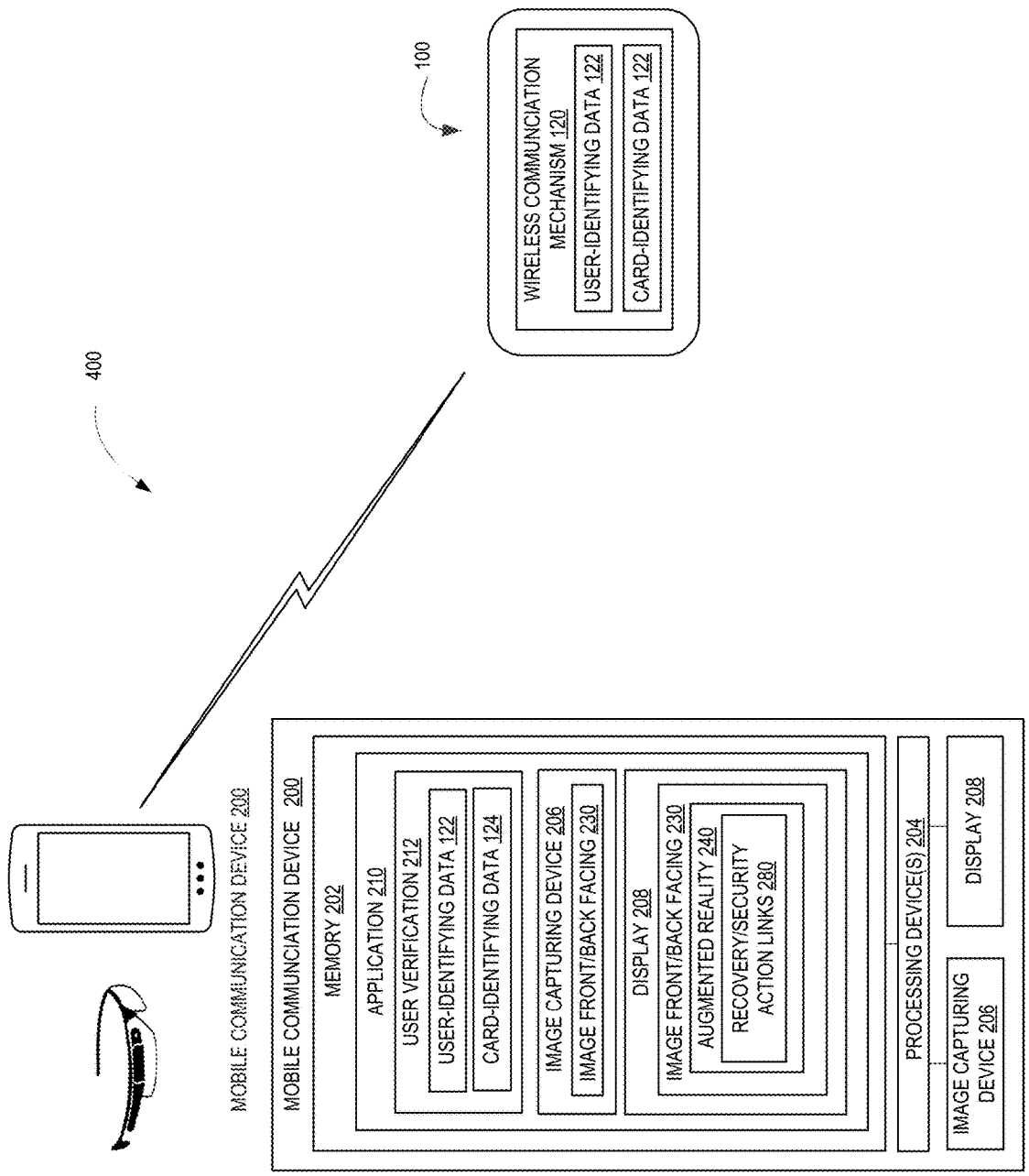
Figure 7:
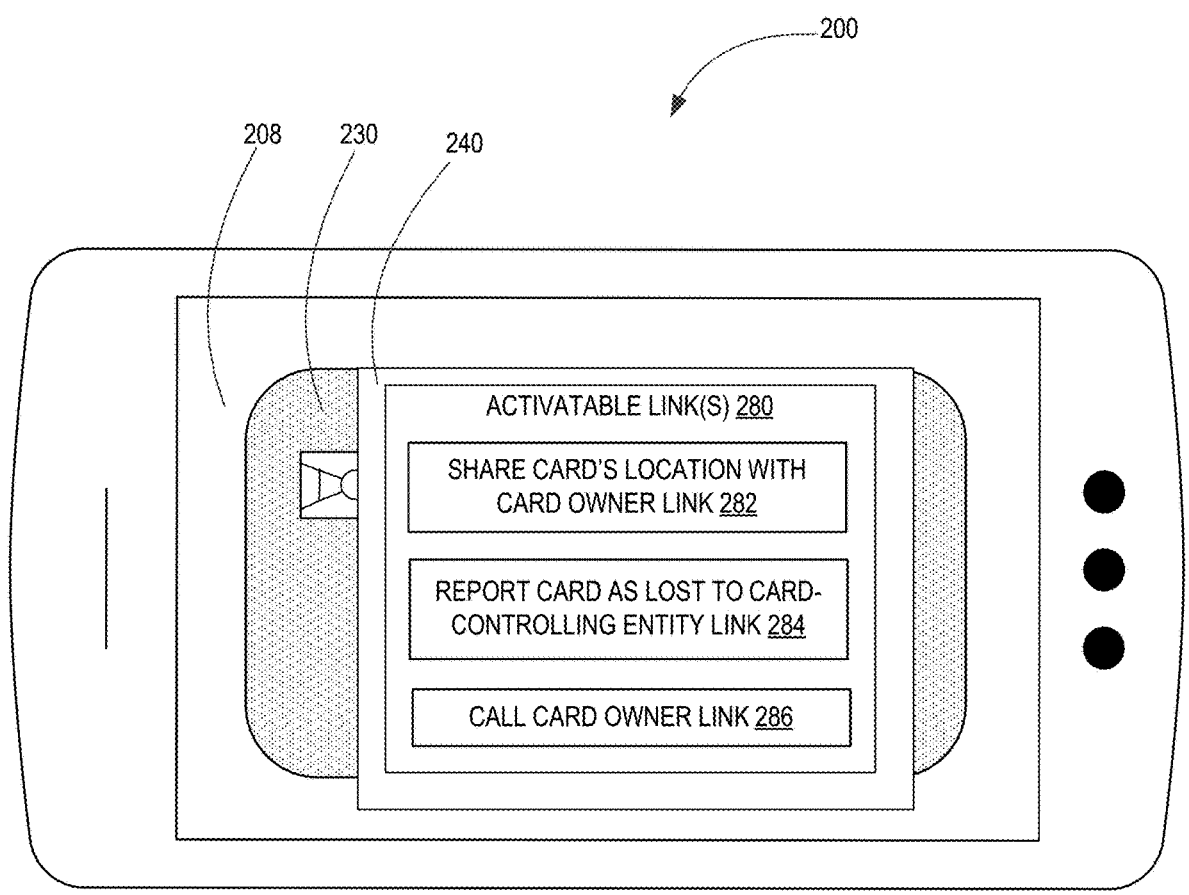
Figure 8:
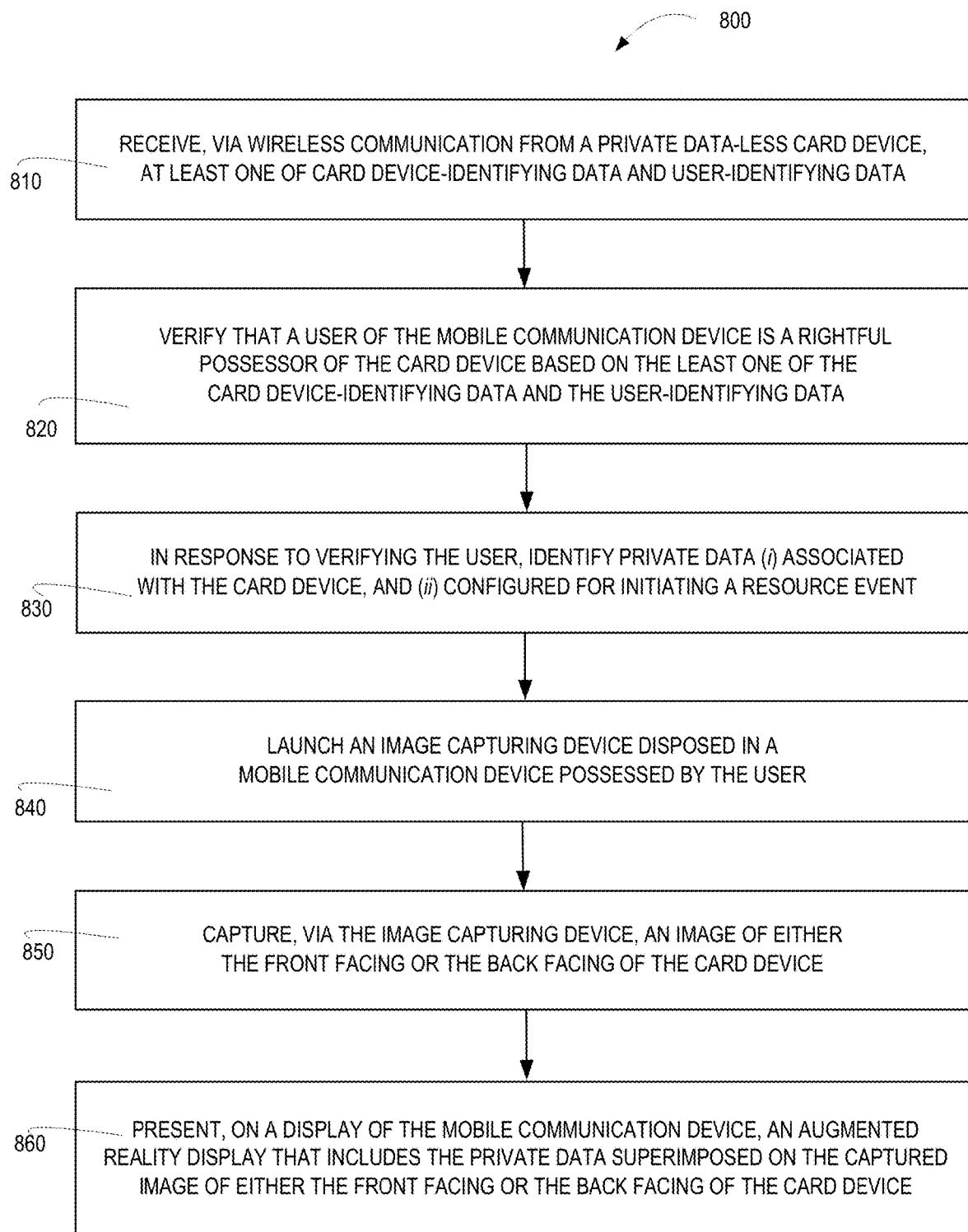
Figure 9:
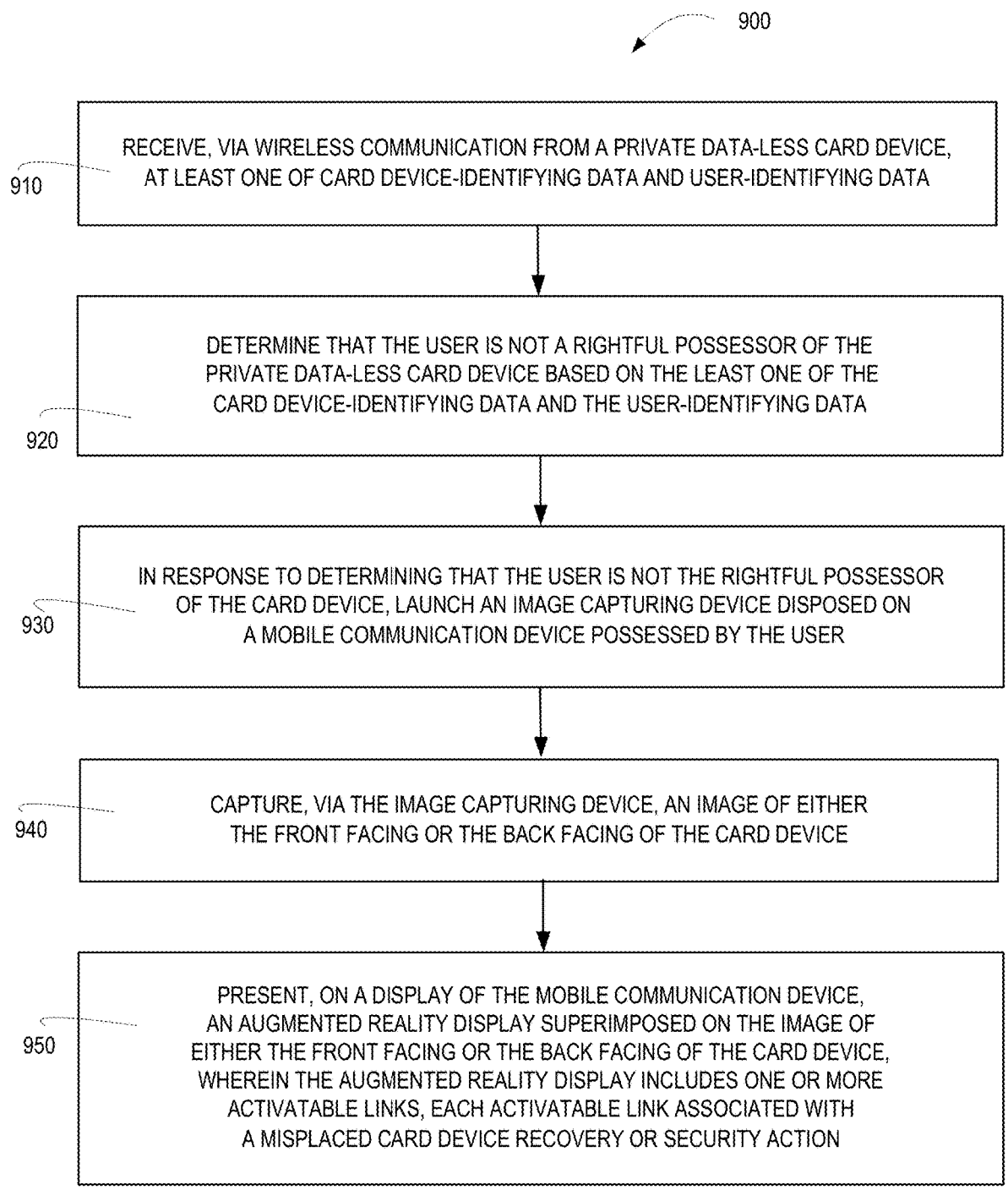

Having thus described embodiments of the disclosure in general terms, reference will now be made to the accompanying drawings, wherein:

FIG. 1 is a schematic of a private data-less card device, in accordance with embodiments of the present invention;

FIGS. 2A-2C are schematic diagrams of different wireless communication mechanism included within a private data-less card device, in accordance with embodiments of the present invention;

FIG. 3 is schematic/block diagram of a system for providing for data card security via a private data-less card device that is enabled for augmented reality display of the private data on a mobile communication device, in accordance with embodiments of the present invention;

FIG. 4 is a schematic diagram of a mobile communication device presenting on the display an augmented reality display of private data superimposed on an image of a private data-less card device, in accordance with embodiments of the present;

FIG. 5 is a schematic diagram of a mobile communication device presenting on the display an augmented reality display of private data and other activatable links, in accordance with embodiments of the present;

FIG. 6 is schematic/block diagram of a system for providing for misplaced data card recovery and security via a private data-less card device that is enabled for augmented reality display of the recovery and security action links on a mobile communication device, in accordance with embodiments of the present invention;

FIG. 7 is a schematic diagram of a mobile communication device presenting on the display an augmented reality display of recovery and security action activatable links, in accordance with embodiments of the present;

FIG. 8 is a flow diagram of a method for card device security, in accordance with embodiments of the present invention; and FIG. 9 is a flow diagram of a method for providing for misplaced data card recovery and security actions, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that implementing augmented reality to display recovery and/or security options on a private data-less card device (i.e., card device that does not include private data visible on a card facing) that has been misplaced. In this regard, the recovery and/or security options assist the rightful possessor/owner of the card device in recovering the misplaced card and/or ensuring the card device is not used by a user other than the rightful possessor/owner of the card device.

According to specific embodiments of the invention, the card device includes a wireless communication mechanism that is configured to communicate card device-identifying data and/or user-identifying data to a mobile communication device in possession of a user. In specific embodiments of the invention, the wireless communication mechanism may include coded-indicia (e.g., Quick Response (QR) code or the like) displayed on a facing of the card device, which encodes card-identifying data. In other specific embodiments of the invention, the wireless communication mechanism may be user-specific imagery displayed on a facing of the card, such as a unique background image or the which, which when captured by the mobile communication device, image recognition techniques are used to identify the user. In still further specific embodiments of the invention, a short-range wireless communication device (e.g., Near Field Communication (NFC) or Radio Frequency identification (RFID) or the like) may be embedded in the card device, such that the short-range wireless device is capable of communicating the card device-identifying data and/or user-identifying data to the mobile communication device.

The mobile communication device includes an application that is configured to receive the card device-identifying data and/or user-identifying data from the card device and verify that the user is not a rightful possessor/owner of the card device based at least on the card device-identifying data and/or the user-identifying data. Once the user has been verified as not being the owner of the card device, the application launches the image capturing device on the mobile communication device and an image is captured of either the front facing or the back facing of the card device. Consequently, the application presents an augmented reality display that includes activatable links (i.e., hyperlinks or the like) superimposed in augmented reality form on the captured image of either the front facing or the back facing of the card device. The activable links provide the finder of the card device recovery and/or security options.

In specific embodiments of the invention, one of the activatable link that are superimposed in augmented reality form on the card is configured to, upon user activation, generate and initiate communication of an alert to the rightful possessor of the card device that indicates that the card device has been found and provides the current geolocation of the card device (i.e., the current location of the mobile communication device as determined by Global Positioning System (GPS) mechanisms therein or the like). Based on the alert, the rightful possessor/owner of the card device can locate and re-possess the card device.

In other specific embodiments of the invention, one of the activatable link that are superimposed in augmented reality form on the card is configured to, upon user activation, generate and initiate communication of a lost card report to a card-issuing entity. In still further specific embodiments of the invention, one of the activatable link that are superimposed in augmented reality form on the card is configured to, upon user activation, initiate a telephone call to the rightful possessor of the card device.

In other specific embodiments of the invention, the application is further configured to, in response to determining that the user is not the rightful possessor of the card device, temporarily disable the card device (i.e., prohibit the card device from initiating a resource transfer event).

Referring to FIG. 1, a schematic diagram is presented of a card device 100, in accordance with embodiments of the present invention. The card device 100 includes a front facing 102 and a back facing 104. As shown in FIG. 1, but not required in embodiments of the present invention, front facing 102 may include a smart chip/processor 106 and back facing 104 may include a magnetic strip 108 both of which may be used individually to initiate a resource transfer event. In accordance with all embodiments of the present invention, the front facing 102 and the back facing 104 of the card device 100 do not physically display any private data used to initiate a resource transfer event. For example, areas 110, in which conventional card devices would have printed or embossed private data, is devoid of any such private data. Private data used to initiate a resource transfer event includes, but is not necessarily limited to, an account number, an expiration date, a card verification value (CVV) code and the like. By not having private data displayed on the card device, the present invention prevents unauthorized resource transfer events by someone other than the rightful possessor/owner of the card device gaining possession of the card device and using the private data to initiate resource transfer events.

Further, card device 100 includes at least one wireless communication mechanism 120 that is configured to wirelessly communicate card-identifying data 122 and/or user-identifying data 124 to a mobile communication device. As discussed infra, in relation to FIG. 3, the mobile communication device stores an application that is configured to, in response to receiving the card-identifying data 122 and/or user-identifying data 124 and verifying the user as the card owner, present an augmented reality display of the private data superimposed on an image of either the front facing 102 and/or back facing 104. It should be noted that for security purposes, the wireless communication mechanism 120 does not communicate the private data, but rather communicates data (i.e., card-identifying data 122 and/or user-identifying data 124) that allows the application on the mobile communication to device to identify the private data. Additionally, as discussed infra, in relation to FIG. 6, the same application is also configured to, in response to receiving the card-identifying data 122 and/or user-identifying data 124 and determining that the user is not the card owner, present an augmented reality display of card recovery and/or security actions superimposed on an image of either the front facing 102 and/or back facing 104.

Referring to FIGS. 2A-2C, schematic diagrams are depicted of card devices 100 having various different wireless communication mechanisms 120, in accordance with embodiments of the present invention. FIG. 2A depicts a card device 100 in which the wireless communication mechanism 120 is coded-indicia 120-A printed on at least one of the front facing 102 and/or back facing of the card device. In specific embodiments of the invention, coded-indicia 120-A is a Quick Response (QR) code that encodes at least one of the card-identifying data 122 and/or user-identifying data 124 and, when captured by an image-capturing device on the mobile communication device, activates the application that is configured to present a display of data in augmented reality form.

FIG. 2B depicts a card device 100 in which the wireless communication mechanism 120 is a short-range wireless device 122-B embedded in the card device 100. The short-range wireless device 122-B may be included within the smart chip/processor 106 shown in FIG. 1 or, in other embodiments may be separate unit. In specific examples, short range wireless device 122-B may a Near Field Communication (NFC) device or a Radio Frequency Identification (RFID) device. In such embodiments of the invention, in which the short range wireless device 122-B is an NFC device, tapping the card device 100 in a specific manner proximate the mobile communication device may trigger (i) communication of the card-identifying data 122 and/or user-identifying data 124 from the card device 100 to the mobile communication device and (ii) activation of the application that is configured to present a display of data in augmented reality form.

FIG. 2C depicts a card device 100 in which the wireless communication mechanism 120 is a user-specific image 122-C displayed on at least one of the front facing 102 and/or back facing of the card device. The user-specific image 122-C is a unique image that may be chosen by the user or, in other instances assigned by the card-issuing entity. For example, user-specific image 122-C may be a facial image of the user or a photograph captured by the user. The user-specific image may be displayed in a designated area of the front facing 102 and/or back facing 104 or may be displayed as a background image encompassing the entirety of the front facing 102 and/or back facing 104. In such embodiments of the invention, the application is configured to present a display of data in augmented reality form or some other application on the mobile communication device possesses image-recognition techniques that are configured to recognize and associate the user-specific image 122-C with the rightful possessor/owner of the card device 100.

Referring to FIG. 3, a schematic/block diagram is presented of a system 300 for providing security in card device, in accordance with embodiments of the present invention. The system includes card device 100, which, as discussed in relation to FIG. 1, does not physically display any private data used to initiate a resource transfer event on either the front facing 102 or the back facing 104 of the card device 100. As previously discussed, in relation to FIGS. 1 and 2, card device 100 includes a wireless communication mechanism 120 that is configured to wirelessly communicate, at least one of card-identifying data 122 and/or user-identifying data 124.

System 300 additionally includes mobile communication device 200, which may comprise a smart phone, smart glasses or any other mobile device having the capability to display data in augmented reality form. Mobile communication device 200 includes a memory 202 and at least one processing device 202 in communication with the memory 202. Memory 202 may comprise volatile and non-volatile memory, such as read-only and/or random-access memory (RAM and ROM), EPROM, EEPROM, flash cards, or any memory common to computing platforms. Moreover, memory 202 may comprise cloud storage, such as provided by a cloud storage service and/or a cloud connection service. Processing devices 204 may be an application-specific integrated circuit ("ASIC"), or other chipset, logic circuit, or other data processing device. Processing device(s) 204 may execute one or more application programming interface (APIs) 206 that interface with any resident programs, such as application 210 or the like, stored in memory 202 of mobile communication device 200 and any external programs. Processing devices(s) 204 may include various processing subsystems (not shown in FIG. 3) embodied in hardware, firmware, software, and combinations thereof, that enable the functionality of mobile communication device 200 and the operability of mobile communication device 200 on a network, such as the Intranet, cellular network(s) and the like. For example, processing subsystems allow for initiating and maintaining communications and exchanging data with other networked devices. For the disclosed aspects, processing subsystems of first computing platform 200 may include any subsystem used in conjunction with application 210 and related tools, routines, sub-routines, algorithms, sub-algorithms, sub-modules thereof.

Further, mobile communication device 200 includes an image-capturing device 206, configured to capture images and/or video and a display 208 for presenting the captured images/video, both of which are in communication with the processing device(s) 204.

Memory 202 of mobile communication device 200 stores application 210 that is configured to receive, via wireless communication, at least one the card-identifying data 122 and/or user-identifying data 124 and perform user verification 212 based at least on the card-identifying data 122 and/or user-identifying data 124. User verification 212 verifies that the user of the mobile communication device 200 is the rightful possessor/owner of the card device 100. In this regard, the user will have been or is required to perform a user authentication at the mobile communication device 200, e.g., submit characteristic data, such as facial image, fingerprints or the like and/or other credentials, such as username, passcode or the like.

In response to verifying the user as the rightful possessor/owner of the card device 100, application 210 is configured to identify private data 220 that is associated with the card device 100 and is configured to initiate a resource transfer event. For example, the private data 220 may include an account number, an expiration date, a CVV code and, in some embodiments, a name of the card holder/owner. It should be noted that in other embodiments of the invention, the name of the card holder/owner is not considered private data used to initiate a resource transfer event and, as such, may be physically displayed/printed on the card device 100. The private data 220 is identified by correlating either the card-identifying data 122 and/or user-identifying data 124 to the private data 220.

Further, the application is configured to launch the image-capturing device 204 and, in response to capturing an image 230 of either the front facing 102 or back facing 104 of the card device 100, present, on the display 208, an augmented reality 240 display that includes at least the private data 220 superimposed on the captured image 230 of either the front facing 102 or back facing 104 of the card device 100. Thus, as the mobile communication device 200 or card device 100 physically moves while capturing the image 230 of the card device 100, the private data 220 superimposed on the captured image 230 in the display 208 moves so as to appear to be physically displayed/printed on a facing of the card device 100.

Referring to FIG. 4, a schematic diagram is presented of a mobile communication device 100 displaying private data 230 in augmented reality form, in accordance with embodiments of the present invention. In the illustrated example of FIG. 4, mobile communication device 200 is a smart telephone. The image-capturing device 206 (shown in FIG. 3) is capturing images 230 of the front facing 102 of the card device 100, which are displayed on the display 208 of the mobile communication device 200. The images 230 of the front facing include augmented reality 240 data that is superimposed on the captured images 230. In accordance with embodiments of the present invention, since the user of the mobile communication device 200 has been verified as the owner of the card device 100, the augmented reality 240 data that is presented is the private data 220. In accordance with specific embodiments of the invention, the private data 220 is presented proximate in location to the areas 110 (shown in FIG. 1) on the front facing 102 or back facing 104 where conventional card devices would have printed or embossed private data.

Referring to FIG. 5, a schematic diagram is presented of a mobile communication device 100 displaying private data 230, as well as additional activatable links in augmented reality form, in accordance with embodiments of the present invention. Similar to FIG. 4, in the illustrated example of FIG. 4, mobile communication device 200 is a smart telephone. The image-capturing device 206 (shown in FIG. 3) is capturing images 230 of the front facing 102 of the card device 100, which are displayed on the display 208 of the mobile communication device 200. The images 230 of the front facing 102 include augmented reality 240 data that is superimposed on the captured images 230. In accordance with embodiments of the present invention, since the user of the mobile communication device 200 has been verified as the owner of the card device 100, the augmented reality 240 data that is presented includes the private data 220. As previously discussed, the private data 220 may include, but is not limited to, an account number 222, an expiration date 224, a CVV code 226 and a username 228.

Additionally, the augmented reality 240 data may include one or more activatable hyperlinks, which are accessible to the user for performing related actions. As shown in FIG. 5, the activatable links may include, but are not limited to, a virtual assistant system link 250 that is configured to, upon user activation, access a virtual assistant and communicate therewith via voice commands or text commands. Once activated by the user, the mobile communication device 200 displays a running dialog of the communication between the user and the virtual assistant. Examples of commands that a user may provide to the virtual assistant include, but are not limited to, card device disablement (i.e., either temporary or permanent), travel notifications, which inform the card-issuing entity of location and/or time period for impending travel and the like.

Additionally, the activatable links may include a resource transfer event link 260 that is configured to, upon user activation, access a resource transfer event system to allow the user to initiate a resource transfer event for at least a portion of the outstanding balance associated with the resource account tied to the card device 100. In specific embodiments of the invention, the resource transfer event link 260 is displayed along with a current outstanding balance on the resource account associated with the card device 100 and a date due for a resource exchange event for the resource account. Once the resource transfer event system is accessed by the user, the user may be allowed to perform other resource exchange events or conduct other resource related functions.

In further embodiments of the invention, the activatable links may include a web site population link 270, which is configured, upon user activation, to populate a webpage currently accessed on the web browser of the mobile communication device with at least a portion of the private data 220. In this regard, since the private data is not physically displayed on the card device, a user can automatically populate a webpage (e.g., an online merchant's check out page or the like) with the private data 220 without being required to transcribe and manually enter the private data 230.

Referring to FIG. 3, a schematic/block diagram is presented of a system 400 for providing recovery and/or security actions in response to user other than the card owner possessing a misplaced card device, in accordance with embodiments of the present invention. The system includes card device 100, which, as discussed earlier, does not physically display any private data used to initiate a resource transfer event on either the front facing 102 or the back facing 104 of the card device 100. As previously discussed, in relation to FIGS. 1 and 2, card device 100 includes a wireless communication mechanism 120 that is configured to wirelessly communicate, at least one of card-identifying data 122 and/or user-identifying data 124.

System 300 additionally includes mobile communication device 200, which may comprise a smart phone, smart glasses or any other mobile device having the capability to display data in augmented reality form. Mobile communication device 200 includes a memory 202 and at least one processing device 202 in communication with the memory 202. The details of the memory and the processing device(s) are the same as those discussed in relation to the system 300 of FIG. 3. Further, mobile communication device 200 includes an image-capturing device 206, configured to capture images and/or video and a display 208 for presenting the captured images/video, both of which are in communication with the processing device(s) 204.

Memory 202 of mobile communication device 200 stores application 210, which may be the same application shown and described in relation to FIG. 3 (i.e., providing the additional feature of recovery and security actions for misplaced card devices) or a standalone application limited to providing the feature of recovery and security actions for misplaced card devices. Application 210-1 is configured to receive, via wireless communication, at least one the card-identifying data 122 and/or user-identifying data 124 and perform user verification 212 based at least on the card-identifying data 122 and/or user-identifying data 124.

In response to failing to verify that the user of the mobile communication device is the rightful possessor/owner of the card device 100 (i.e., the user of the mobile communication is someone who has found a card device misplaced by the rightful possessor/owner of the card), application 210-1 is configured to launch the image-capturing device 204 and, in response to capturing an image 230 of either the front facing 102 or back facing 104 of the card device 100, present, on the display 208, an augmented reality 240 display that includes activatable links 280 associated with card recovery and/or security actions superimposed on the captured image 230 of either the front facing 102 or back facing 104 of the card device 100. In this regard, the finder of the misplaced card device can activate the links to perform actions that will assist the rightful possessor/owner of the card device 100 in recovering the card device 100 or limit the likelihood of the card device being used for unauthorized resource transfer events.

Referring to FIG. 7, a schematic diagram is presented of a mobile communication device 100 displaying activatable links 280 associated with card recovery and/or security actions in augmented reality form, in accordance with embodiments of the present invention. Similar to FIGS. 4 and 5, in the illustrated example of FIG. 7, mobile communication device 200 is a smart telephone. The image-capturing device 206 (shown in FIG. 6) is capturing images 230 of the front facing 102 of the card device 100, which are displayed on the display 208 of the mobile communication device 200. The images 230 of the front facing 102 include augmented reality 240 data that is superimposed on the captured images 230. In accordance with embodiments of the present invention, since the user of the mobile communication device 200 has been determined to not be the rightful possessor/owner of the card device 100, the augmented reality 240 data that is presented includes activable links 280 associated with card recovery and/or security actions.

The activatable hyperlinks 280, which are accessible to the user for performing related actions may include, but are not limited to, a location sharing link 282 that is configured to, upon user activation, generate and initiate a communication of an alert or text/SMS message to the rightful possessor/owner of the card device 100 that notifies the owner that their card device has been found and the current location of the card device 100. In this regard, application 210 relies on a location determining mechanism within the mobile device, such as Global Positioning System (GPS) device or the like to determine the current geo-location of the mobile communication device. Since the card device is currently co-located with the mobile communication device, the location of the mobile communication device is the same as the location of the card device. The alert or text/SMS message may include a map that provides the location of the card device and current location of the rightful possessor/owner of the card device so that the rightful possessor/owner of the card device can readily navigate to the location of the card device.

Additionally, the activatable links 280 may include a lost card reporting link 284 that is configured to, upon user activation, report the card device is being lost to a card-issuing/controlling entity, which can then take appropriate actions such as temporarily or permanently disabling the card device. In other embodiments of the invention. the activable link 280 may include a call card owner link 286 configured to initiate a telephone call to the rightful possessor/owner of the card device. In such embodiments of the invention, the call may be made without the user of the mobile device knowing or the mobile device displaying the telephone number of the rightful possessor/owner of the card device and/or without the mobile communication device of the rightful possessor/owner of the card device displaying the phone number of the user/finding of the card device. In lieu of displaying a calling party number, the mobile communication device may display a card found notification or the like.

Referring to FIG. 8, a flow diagram is presented of a method 800 for providing card device security, in accordance with embodiments of the present invention. At Event 810, user-identifying data and/or card-identifying data is received at a mobile communication device via wireless communication from a private data-less card device (i.e., a card that does not have any private data used for initiating a resource transfer event printed, embossed or otherwise actually displayed on a facing of the card). As previously discussed, the user-identifying data and/or card-identifying data may be received by capturing an image of coded-indicia, such as a QR code, or a user-specific/unique image or via short-range wireless communication, such as NFC, RFID or the like.

At Event 820, the user of the mobile communication is verified as the rightful possessor/owner of the card device based at least on user-identifying data and/or card-identifying data. In this regard, the user of the mobile communication has previously been authenticated or is authenticated and is compared to the user-identifying data or the card-identifying data (which is capable of identifying the rightful possessor/owner of the card device).

In response to verifying the user of the mobile communication device as the rightful possessor/owner of the card device, at Event 830, private data associated with the card device and configured for initiating a resource transfer event is identified. Identification of the private data is based on a correlation/linkage between the private data and the user-identifying data and/or the card-identifying data.

At Event 840, an image-capturing device on the mobile communication device is launched and, at Event 850, image(s) of either the front facing or the back facing of the card device are captured by the image-capturing device.

At Event 860, an augmented reality display is presented on a display of the mobile communication device that includes at least the private data superimposed on the captured image(s) of the front facing or back facing of the card device. In alternate embodiments other data may be presented in the augmented reality display, including links to a virtual assistant system and/or resource transfer event processing system or the like.

Referring to FIG. 9, a flow diagram is presented of a method 600 for providing card recovery and security actions for a misplaced card device, in accordance with embodiments of the present invention. At Event 910, user-identifying data and/or card-identifying data is received at a mobile communication device via wireless communication from a private data-less card device (i.e., a card that does not have any private data used for initiating a resource transfer event printed, embossed or otherwise actually displayed on a facing of the card). As previously discussed, the user-identifying data and/or card-identifying data may be received by capturing an image of coded-indicia, such as a QR code, or a user-specific/unique image or via short-range wireless communication, such as NFC, RFID or the like.

At Event 920, a determination is made that the user of the mobile communication is not the rightful possessor/owner of the card device based at least on user-identifying data and/or card-identifying data. In this regard, the user of the mobile communication has previously been authenticated or is authenticated and is determined to not match the to the user-identifying data (i.e., rightful possessor/owner of the card device data) or the card-identifying data (which is capable of identifying the rightful possessor/owner of the card device).

In response to determining that the user of the mobile communication device is not the rightful possessor/owner of the card device, at Event 930, an image-capturing device on the mobile communication device is launched and, at Event 940, image(s) of either the front facing or the back facing of the card device are captured by the image-capturing device.

At Event 950, an augmented reality display is presented on a display of the mobile communication device that includes one or more activated links associated with recovery actions or security actions superimposed on the captured image(s) of the front facing or back facing of the card device. As previously discussed, the recovery actions may be sharing the location of the card device with the rightful possessor/owner of the card device or calling the rightful possessor/owner and the security actions may be disabling the card or contacting the card-issuing entity.

Thus, present embodiments of the invention provide for augmented reality display of recovery and/or security options on a private data-less card device that has been misplaced. The recover and security options provide the rightful possessor/owner of the card device the ability to regain possession of the card device and/or prevent unauthorized/wrongful use of the card device.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for misplaced card device security, the system comprising:
   a card device having a front facing and a back facing, wherein the front facing and the back facing do not display any private data used to initiate a resource transfer event, wherein the card device includes a wireless communication mechanism configured to wirelessly communicate at least one of card device-identifying data and user-identifying data; and a mobile communication device in possession of a user and including:
a memory,
one or more processing devices in communication with the memory,
an image capturing device in communication with at least one of the one or more processing devices, and
a display in communication with at least one of the one or more processing devices,
wherein the memory stores an application that is executable by at least one of the one or more processing devices and is configured to:
receive, via wireless communication, at least one of the card device-identifying data and the user-identifying data,
determine that the user is not a rightful possessor of the card device based on the least one of the card device-identifying data and the user-identifying data;
in response to determining that the user is not the rightful possessor of the card device:
launch the image capturing device,
capture, via the image capturing device, an image of either the front facing or the back facing of the card device, and
present, on the display, an augmented reality display superimposed on the image of either the front facing or the back facing of the card device, wherein the augmented reality display includes one or more activatable links, each activatable link associated with a misplaced card device recovery or security action.

2. The system of claim 1, wherein the application is further configured to present the augmented reality display that further includes the one or more activatable links, wherein one of the one or more activatable links is configured to, upon user activation, generate and initiate communication of an alert to the rightful possessor of the card device that indicates a current geolocation of the card device.

3. The system of claim 1, wherein the application is further configured to present the augmented reality display that further includes the one or more activatable links, wherein one of the one or more activatable links is configured to, upon user activation, generate and initiate communication of a lost card report to a card-issuing entity.

4. The system of claim 1, wherein the application is further configured to present the augmented reality display that further includes the one or more activatable links, wherein one of the one or more activatable links is configured to, upon user activation, initiate a telephone call to the rightful possessor of the card device.

5. The system of claim 1, wherein the application is further configured to, in response to determining that the user is not the rightful possessor of the card device, disable the card device for resource transfer event use.

6. The system of claim 1, wherein the wireless communication mechanism is coded-indicia displayed on at least one of the front facing and back facing of the card device, wherein the coded-indicia is configured to encode the card device-identifying data, and
wherein the application is further configured to (i) receive the card device-identifying data by capturing, via the image-capturing device, an image of the coded-indicia and (ii) determine that the user is not the rightful possessor of the card device by decoding the captured coded-indicia to identify the card device-identifying data and failing to match the card device-identifying data to the user.

7. The system of claim 1, wherein the wireless communication mechanism is a user-specific image displayed on at least one of the front facing and back facing of the card device, wherein the user-specific image is associated with the user-identifying data, and
wherein the application is further configured to (i) receive the user-identifying data by capturing, via the image-capturing device, an image of the user-specific image, and (ii) determine that the user is not the rightful possessor of the card device by implementing image recognition techniques to determine that the user-specific image is not associated with the user.

8. The system of claim 1, wherein the wireless communication mechanism is a short-range wireless communication device embedded in the card device, wherein the short-range wireless communication device is configured to communicate at least one of the card device-identifying data and the user-identifying data, and
wherein the application is further configured to receive, via short-range wireless communication, the at least one of the card device-identifying data and the user-identifying data.

9. A computer-implemented method for misplaced card device security, the method executed by one or more computing processor devices and comprising:
receiving, at a mobile communication device via wireless communication from a private data-less card device, at least one of the card device-identifying data and the user-identifying data;
determining that a user of the mobile communication device is not a rightful possessor of the private data-less card device based on the least one of the card device-identifying data and the user-identifying data;
in response to determining that the user is not the rightful possessor of the card device:
launching an image capturing device disposed on a mobile communication device possessed by the user;
capturing, via the image capturing device, an image of either the front facing or the back facing of the private data-less card device; and
presenting, on a display of the mobile communication device, an augmented reality display superimposed on the image of either the front facing or the back facing of the card device, wherein the augmented reality display includes one or more activatable links, each activatable link associated with a misplaced card device recovery or security action.

10. The computer-implemented method of claim 9, wherein presenting further includes presenting the augmented reality display that further includes the one or more activatable link, wherein one of the one or more activatable links is configured to, upon user activation, generate and initiate communication of an alert to the rightful possessor of the card device that indicates a current geolocation of the card device.

11. The computer-implemented method of claim 9, wherein presenting further includes presenting the augmented reality display that further includes the one or more activatable link, wherein one of the one or more activatable links is configured to, upon user activation, generate and initiate communication of a lost card report to a card-issuing entity.

12. The computer-implemented method of claim 9, wherein presenting further includes presenting the augmented reality display that further includes the one or more activatable link, wherein one of the one or more activatable links is configured to upon user activation, initiate a telephone call to the rightful possessor of the card device.

13. The computer-implemented method of claim 9, wherein in response to determining that the user is not the rightful possessor of the card device, the method further includes disabling the card device for resource transfer event use.

14. The computer-implemented of method of claim 9, wherein receiving, via wireless communication from a private data-less card device, at least one of the card device-identifying data and the user-identifying data further comprises receiving, via the wireless communication from a private data-less card device, at least one of the card device-identifying data and the user-identifying data, wherein the wireless communication is chosen from the group consisting of (i) capturing coded-indicia displayed on at least one of the front facing and back facing of the card device, wherein the coded-indicia is configured to encode the card device-identifying data, (ii) capturing a user-specific image displayed on at least one of the front facing and back facing of the card device, wherein the user-specific image is associated with the user-identifying data, and (iii) receiving short-range wireless communication from the card device, wherein the short-range wireless communication is configured to communicate at least one of the card device-identifying data and the user-identifying data.

15. A computer program product comprising:
a non-transitory computer-readable medium comprising sets of codes for causing one or more computing processing devices to:
receive, at a mobile communication device via wireless communication from a private data-less card device, at least one of the card device-identifying data and the user-identifying data;
determine that a user of the mobile communication device is not a rightful possessor of the private data-less card device based on the least one of the card device-identifying data and the user-identifying data;
in response to determining that the user is not the rightful possessor of the card device:
launch an image capturing device disposed on a mobile communication device possessed by the user;
capture, via the image capturing device, an image of either the front facing or the back facing of the private data-less card device; and
present, on a display of the mobile communication device, an augmented reality display superimposed on the image of either the front facing or the back facing of the card device, wherein the augmented reality display includes one or more activatable links, each activatable link associated with a misplaced card device recovery or security action.

16. The computer program product of claim 15, wherein the set of codes for causing the one or more computing processor devices to present are further configured to cause the one or more computing processor devices to present the augmented reality display that further includes the one or more activatable link, wherein one of the one or more activatable links is configured to, upon user activation, generate and initiate communication of an alert to the rightful possessor of the card device that indicates a current geolocation of the card device.

17. The computer program product of claim 15, wherein the set of codes for causing the one or more computing processor devices to present are further configured to cause the one or more computing processor devices to present the augmented reality display that further includes the one or more activatable link, wherein one of the one or more activatable links is configured to, upon user activation, generate and initiate communication of a lost card report to a card-issuing entity.

18. The computer program product of claim 15, wherein the sets of codes further include a set of codes for cause the one or more computing processor devices to, in response to determining that the user is not the rightful possessor of the card device, disable the card device for resource transfer event use.

19. The computer program product of claim 15, wherein the set of codes for causing the one or more computing processor devices to receive are further configured to cause the one or more computing processor devices to receive, via wireless communication from a private data-less card device, at least one of the card device-identifying data and the user-identifying data, wherein the wireless communication includes capturing coded-indicia displayed on at least one of the front facing and back facing of the card device, wherein the coded-indicia is configured to encode the card device-identifying data.

20. The computer program product of claim 15, wherein the set of codes for causing the one or more computing processor devices to receive are further configured to cause the one or more computing processor devices to receive, via wireless communication from a private data-less card device, at least one of the card device-identifying data and the user-identifying data, wherein the wireless communication includes capturing a user-specific image displayed on at least one of the front facing and back facing of the card device, wherein the user-specific image is associated with the user-identifying data.

* * * * *